United States Patent Office 3,239,252
Patented Mar. 8, 1966

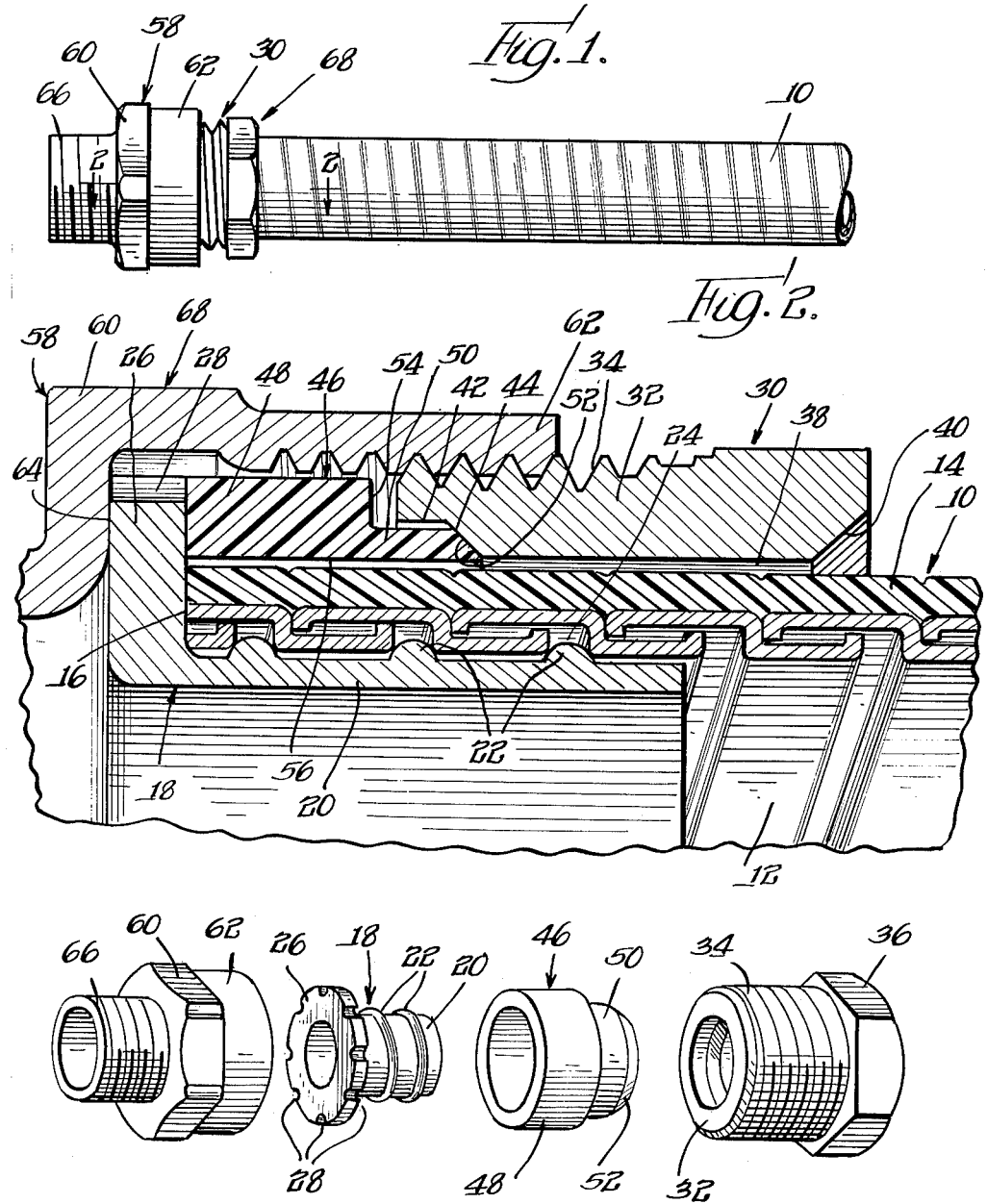

3,239,252
CONDUIT FITTING
Harry A. Schmitt and David F. Hyde, Chicago, Ill., assignors to Midwest Electric Manufacturing Company, Chicago, Ill., a corporation of Illinois
Filed May 23, 1962, Ser. No. 196,998
4 Claims. (Cl. 285—250)

This invention relates to a conduit fitting, and particularly to a pressure-tight fitting or connector for liquid-tight flexible metal electrical conduit.

Flexible electrical conduit is generally made in spiral or convoluted form. For use in machine tools where cooling liquids, such as oil, may be splashed about quite extensively, special liquid-tight flexible conduits are used. These consist essentially of the well-known convoluted metal conduit with a liquid-proof plastic covering such as Geon or polyvinylchloride. Obviously, such conduits would be ineffective if they could not be sealed in liquid-tight manner to the junction boxes or the like to which they are connected.

Accordingly, it is an object of this invention to provide a new and improved conduit fitting for joining a liquid-proof electrical conduit to a junction box or the like in liquid-tight relation.

It is a further object of this invention to provide a conduit fitting for liquid-tight flexible metallic conduit requiring less than a complete turn of a wrench or the like tool to seat the fitting in liquid-tight position.

Yet another object of this invention is to provide a liquid-tight fitting for use with liquid-tight flexible metallic electrical conduit which provides an efficient seal and supports the conduit against excessive collapse.

It is another object of this invention to provide a fitting for liquid-tight flexible metallic conduit which is reusable.

It is still another object of this invention to provide such a fitting affording a particularly efficient electrical ground.

It is a further object of this invention to provide a fitting of the character heretofore set forth utilizing a compression gland which simultaneously affords a seal with the conduit and forces a grounding ferrule into proper grounding position.

Other and further objects and advantages of the present invention will be apparent from the following description when taken in connection with the accompanying drawings wherein:

FIG. 1 is a plan view showing a section of liquid-tight flexible metallic electrical conduit having thereon a fitting constructed in accordance with the principles of the present invention;

FIG. 2 is a fragmentary longitudinal section through the conduit and fitting on a greatly enlarged scale as taken along the line 2—2 in FIG. 1; and FIG. 3 is an exploded perspective view of the conduit fitting.

Referring now in greater particularity to the figures, there will be seen a liquid-tight flexible metallic conduit 10. This conduit includes the usual interlocking spirals or convolutions 12 of formed metal strip, and further has a covering or jacket 14 of Geon or polyvinylchloride securely fitted thereon. The conduit, including the convolutions and the jacket is terminated at 16, being sawed off or otherwise suitably severed.

The conduit fitting includes a die cast ferrule 18 of suitable metal. The ferrule includes a hollow shank or body 20 having a spiral rib or thread 22 thereon which threads into internal spiral grooves 24 of the conduit between portions of adjacent convolutions 12. The ferrule further has a disc or ring-like head 26 which is provided about its periphery with a plurality of circumferentially spaced notches 28 for facilitating gripping of the ferrule to thread it into the end of the conduit.

The fitting further includes a metallic compression nut 30. The nut has a body portion 32 with threads 34 thereon of diminishing depth. In addition, the compression nut has a head 36 of suitable non-circular configuration, indicated as hexagonal, to facilitate gripping of the nut. The nut is provided with a cylindrical axial bore 38 and the entrance to the bore at the head end conveniently is beveled as indicated at 40 to facilitate entrance of the conduit into the nut.

At the opposite end, the compression nut is counterbored at 42, and the counterbore is tapered, beveled or chamfered at 44 to join the main bore 38. The bevel 44 forms a cam surface as will be apparent hereinafter.

The conduit fitting further includes a nylon compression ring 46. The compression ring includes a cylindrical body 48 and a projecting nose or lip 50 having a tapered end 52 complemetary to the bevel 44 of the compression nut 30. The projection 50 joins the body 48 at a shoulder 54 forming a positive stop with regard to the end of the compression nut 30. The entire length of the compression ring is provided with an axial bore 56 slightly greater in diameter than the outside diameter of the jacket 14 of the conduit 10. The outside diameter of the body 48 is the same as that of the head 26 of the ferrule.

The conduit fitting also includes a body 58 of suitable metallic composition. The body includes a hexagonal portion 60 for convenient gripping by a wrench or the like tool, and also includes an internally threaded cylindrical portion 62 cooperable with the threads 34 of the compression nut 30. The body has an offset in the vicinity of the hexagonal section 60, and the internal portion of the offset forms a stop 64 engageable with the top surface of the head 26 of the ferrule 18.

The body 58 further includes an axially projecting externally threaded portion 66. This portion is designed to cooperate with a junction box or the like, in conventional fashion, with a compressible washer or "O" ring, and a nut to seal the fitting to the junction box.

To assemble the fitting, hereinafter identified by the number 68, with the conduit 10, the compression nut 30 and nylon compression ring 46 are slipped over the end of the conduit. The ferrule 18 then is threaded into the end of the conduit until the underside of the head 26 abuts the end of the conduit. The compression nut then is pushed toward the end of the conduit to hold the end of the compression ring against the underside of the ferrule head. The body 58 is then slipped over the end of the conduit and over the ferrule head 26 and compression ring 46, and is threaded into engagement with the compression nut 30, being turned as far as possible with the fingers. After the body is finger-tightened on the compression nut, suitable tools, such as wrenches or pliers, are used to complete tightening of the body relative to the compression nut. Less than a complete turn, generally about three-quarters of a turn, is required with the wrenches or the like to complete tightening.

During such tightening, the bevel 44 of the compression nut engages the tapered end surface 52 of the compression ring in complementary relation. These two engaging surfaces act as cams, and the end of the compression ring is collapsed into fluid-tight, sealing relation with the surface of the conduit jacket 14. Threading together of the compression nut and body is limited by abutment of the inner end of the compression nut with the shoulder 54 of the compression ring or gland. Since the cam surfaces are at approximately 45 degrees relative to the axis, the end of the compression ring is collapsed on each side the distance of the spacing shown in FIG. 2 between the end of the compression nut and the stop 54, the parts in FIG. 2 being shown in finger-tight position. This positively prevents over-tightening, which could result in deformation or destruction of the compression ring.

Due to the telescoping action of the threading of the body on to the compression nut, the ferrule head 26 is clamped against the stop 54 of the body 58. This affords excellent electrical contact between the body and the ferrule. The ferrule is in good electrical engagement with the convolutions of the conduit through being threaded thereto. Accordingly, the body 58 is electrically connected to the conduit, and grounds the conduit when the body is grounded to a junction box or the like.

In tightening the fitting on the conduit, the axial clearance between the nut and the compression ring first is taken up, as heretofore noted, by the first half-turn of rotation by a wrench or the like. A liquid-tight seal is thus produced as the front portion or lip of the compression ring is collapsed against the conduit. The adjacent heavy or thick body portion of compression ring and the counterbored portion of the compression nut positively prevent outward bulging of the front portion or lip of the compression ring. An additional quarter-turn of the compression nut further tightens the compression ring against the conduit, creating a pressure-tight seal therewith. The grounding ferrule prevents collapse of the conduit under the sealing pressure. The last mentioned quarter-turn of the body relative to the compression nut places an axial compression load on the body of the compression ring, thereby insuring aggressive engagement of the ferrule head with the stop of the body, even should rather substantial tensile stress be imposed on the conduit.

The coordinated design of the various parts of the fitting limits the total deformation of the compression ring or gland. This positively prevents stressing of the compression ring beyond its elastic limit, thereby avoiding permanent deformation and allowing the fitting to be reused.

After the initial finger-tight assembly, the three-quarter turn heretofore noted which produces the pressure-tight seal is sufficient to fulfill electrical resistance, pull-out, and sealing requirements of all testing and regulating agencies, including the Underwriters' Laboratories.

It will be observed that at the hexagonal end of the compression nut, the diameter of the internal bore is such as to form a fairly close fit with the conduit jacket. Furthermore, the internal bore has a significant axial length, thereby restraining movement of the flexible conduit, whereby to prevent disturbance of the pressure-tight seal.

It will be observed that the abutment of the compression nut with the shoulder of the compression ring is over a large enough area to prevent local deformation of the compression ring. As will be understood, local deformation could result in loss of the precompression of the ring body.

The use of nylon or other compressible materials for the compression ring or gland allows a circumferentially continuous surface to be provided. Metal surfaces necessarily are slotted or split, thereby affording access to liquids.

The outside diameter of the head of the grounding ferrule is necessarily substantially larger than the outside diameter of the conduit to afford the proper area for engagement by the compression ring. Concomitantly, this affords a desirably large area for electrical contact with the body of the fitting. The large diameter provides a further benefit in facilitating threading the ferrule into and out of a section of conduit.

Although the invention has been shown particularly as embodied in a straight connecter for connection to a junction box or the like, it will be understood that the invention is equally usable with other standard forms of fittings, including 45° and 90° angle connectors, and couplings. Thus, it will be understood that the illustrative example is exemplary only. Various changes in structure will no doubt occur to those skilled in the art, and will be understood as forming as part of the present invention insofar as they fall within the spirit and scope of the appended claims.

This invention is claimed as follows:

1. A conduit fitting comprising a ring of compressible material having a relatively small diameter cylindrical portion with a tapered end section thereon and an integral relatively large diameter portion providing a shoulder forming a positive stop, said ring being adapted to encircle a conduit, a compression member encircling said ring and having a complementary tapered surface and a complementary positive stop, a metal ferrule having a threaded body adapted to fit threadedly within a metallic conduit in electrical engagement therewith and further having a head adapted to extend radially beyond said conduit and engageable by said ring portion of relatively large diameter, and a body having an internal stop engageable by said ferrule head on the side opposite said ring, said body and said compression member having complementary thread means thereon for drawing said body and said member axially toward one another to collapse said ring against a conduit upon engagement of said tapered surfaces, said positive stops engaging one another and thereby limiting movement of said compression member axially relative to said ring and compressing said ring axially against the head of said ferrule to hold said head against the internal stop of said body.

2. A conduit fitting as set forth in claim 1 wherein said compression member has a smooth cylindrical counterbore adjacent said relatively small diameter cylindrical portion and wherein said compression member tapered surface is recessed at the end of said cylindrical counterbore.

3. A conduit fitting for cooperation with a conduit of predetermined outside diameter, said fitting comprising a ring of compressible material having a relatively small diameter cylindrical portion with a tapered end section thereon and an integral relatively large diameter portion providing a shoulder forming a positive stop, said ring having an axial bore of at least slightly greater inside diameter than said predetermined outside diameter of a conduit for encircling said conduit with initial radial spacing therebetween, a compression member encircling said ring and having a complementary tapered surface, and a complementary positive stop, said tapered surfaces initially engaging one another with said positive stops axially spaced apart, a metal ferrule having a threaded body adapted to fit threadedly within a metallic conduit in electrical engagement therewith and further having a head adapted to extend radially beyond said conduit and engagable by said ring portion of relatively large diameter, and a body having an internal stop engagable by said ferrule head on the side opposite said ring, said body and said compression member having complementary thread means thereon for drawing said body and said member axially toward one another to collapse said ring against a conduit upon engagement of said tapered surfaces in camming fashion, the difference between the conduit predetermined outside diameter and the ring internal diameter being related to the angle of said tapered end section and said tapered complementary surface and to the initial axial spacing between said positive stops to bring said ring into tight engagement with said conduit prior to engagement of said positive stops, said positive stops upon engagement with one another limiting movement of said compression member axially relative to said ring and compressing said ring axially against the head of said ferrule to hold said head against the internal stop of said body while limiting radial deformation of said ring.

4. A conduit fitting as set forth in claim 3 wherein the radial thickness of said relatively small diameter cylindrical portion is at least as great as the initial axial spacing between the said positive stops.

References Cited by the Examiner

UNITED STATES PATENTS

| | | | |
|---|---|---|---|
| 1,665,346 | 4/1928 | Clarke | 285—356 |
| 2,503,169 | 4/1950 | Phillips | 285—250 |
| 2,522,785 | 9/1950 | Hanson | 285—382.7 |
| 2,941,025 | 6/1960 | Wayman | 285—348 |

FOREIGN PATENTS

| | | |
|---|---|---|
| 218,472 | 11/1958 | Australia. |
| 224,577 | 10/1959 | Australia. |
| 809,040 | 12/1936 | France. |
| 1,101,782 | 4/1955 | France. |
| 1,286,469 | 1/1962 | France. |
| 879,151 | 10/1961 | Great Britain. |
| 598,564 | 10/1959 | Italy. |

CARL W. TOMLIN, *Primary Examiner.*

D. W. AROLA, *Assistant Examiner.*